(12) United States Patent
Frenkel et al.

(10) Patent No.: US 7,770,221 B2
(45) Date of Patent: Aug. 3, 2010

(54) METHOD AND APPARATUS FOR COMBINING TRAFFIC ANALYSIS AND MONITORING CENTER IN LAWFUL INTERCEPTION

(75) Inventors: Assaf Frenkel, Ramat Hasharon (IL); Adam Weinberg, Netanya (IL); Yossi Ofek, Tel Mond (IL); Eyal Ben-Aroya, Rehovot (IL)

(73) Assignee: Nice Systems, Ltd., Raanana (IL)

( * ) Notice: Subject to any disclaimer, the term of this patent is extended or adjusted under 35 U.S.C. 154(b) by 936 days.

(21) Appl. No.: 10/581,437

(22) PCT Filed: May 18, 2006

(86) PCT No.: PCT/IL2006/000591

§ 371 (c)(1),
(2), (4) Date: Jun. 2, 2006

(87) PCT Pub. No.: WO2007/135656

PCT Pub. Date: Nov. 19, 2007

(65) Prior Publication Data

US 2009/0007263 A1  Jan. 1, 2009

(51) Int. Cl.
| | |
|---|---|
| G06F 11/00 | (2006.01) |
| G06F 12/14 | (2006.01) |
| G06F 13/00 | (2006.01) |
| G08B 23/00 | (2006.01) |
| G06F 7/04 | (2006.01) |
| G06F 15/16 | (2006.01) |
| G06F 17/30 | (2006.01) |
| H04L 29/06 | (2006.01) |
| H04N 7/06 | (2006.01) |

(52) U.S. Cl. .............................. 726/22; 726/4; 726/26

(58) Field of Classification Search ..................... 726/4, 726/22, 26
See application file for complete search history.

(56) References Cited

U.S. PATENT DOCUMENTS 4,145,715 A   3/1979   Clever (Continued)

FOREIGN PATENT DOCUMENTS

DE   1 035 833 3   7/2005

(Continued)

OTHER PUBLICATIONS

U.S. Appl. No. 10/484,107, filed Jul. 2002, Freedman, et al.

(Continued)

*Primary Examiner*—Shin-Hon Chen
(74) *Attorney, Agent, or Firm*—Ohlandt, Greeley, Ruggiero & Perle, L.L.P.

(57) ABSTRACT

A method and apparatus for integrating intercepted information with information obtained from an at least one data retention source, the method comprising receiving intercepted information from an interception source, receiving information from a data retention source, and analyzing the information received from the data retention source, in association with the intercepted information. The intercepted information can comprise meta data related to the intercepted communications, and/or the contents of the communication themselves. This enables a user such as a law enforcement agency to reveal possibly indirect connections between target entities s wherein the connections involve non-target entities. The method and apparatus combine interception and content analysis methodologies with traffic analysis techniques.

24 Claims, 4 Drawing Sheets

U.S. PATENT DOCUMENTS

| | | |
|---|---|---|
| 4,527,151 A | 7/1985 | Byrne |
| 5,051,827 A | 9/1991 | Fairhurst |
| 5,091,780 A | 2/1992 | Pomerleau |
| 5,303,045 A | 4/1994 | Richards et al. |
| 5,307,170 A | 4/1994 | Itsumi et al. |
| 5,353,618 A | 10/1994 | Roper et al. |
| 5,404,170 A | 4/1995 | Keating |
| 5,491,511 A | 2/1996 | Odle |
| 5,519,446 A | 5/1996 | Lee |
| 5,734,441 A | 3/1998 | Kondo et al. |
| 5,742,349 A | 4/1998 | Choi et al. |
| 5,751,346 A | 5/1998 | Dozier et al. |
| 5,790,096 A | 8/1998 | Hill, Jr. |
| 5,796,439 A | 8/1998 | Hewitt et al. |
| 5,847,755 A | 12/1998 | Wixson et al. |
| 5,895,453 A | 4/1999 | Cook et al. |
| 5,920,338 A | 7/1999 | Katz |
| 6,014,647 A | 1/2000 | Nizzar et al. |
| 6,028,626 A | 2/2000 | Aviv et al. |
| 6,031,573 A | 2/2000 | Maccormack et al. |
| 6,037,991 A | 3/2000 | Thro et al. |
| 6,070,142 A | 5/2000 | McDonough et al. |
| 6,081,606 A | 6/2000 | Hansen et al. |
| 6,092,197 A | 7/2000 | Coueignoux |
| 6,094,227 A | 7/2000 | Guimier |
| 6,111,610 A | 8/2000 | Faroudja |
| 6,134,530 A | 10/2000 | Bunting et al. |
| 6,138,139 A | 10/2000 | Beck et al. |
| 6,167,395 A | 12/2000 | Beck et al. |
| 6,170,011 B1 | 1/2001 | Beck et al. |
| 6,212,178 B1 | 4/2001 | Beck |
| 6,230,197 B1 | 5/2001 | Beck et al. |
| 6,295,367 B1 | 9/2001 | Crabtree et al. |
| 6,327,343 B1 | 12/2001 | Epstein et al. |
| 6,330,025 B1 | 12/2001 | Arazi et al. |
| 6,345,305 B1 | 2/2002 | Beck et al. |
| 6,427,137 B2 | 7/2002 | Petrushin |
| 6,549,613 B1 | 4/2003 | Dikmen |
| 6,553,217 B1 | 4/2003 | Kundorf |
| 6,570,608 B1 | 5/2003 | Tserng |
| 6,604,108 B1 | 8/2003 | Nitahara |
| 6,628,835 B1 | 9/2003 | Brill et al. |
| 6,704,409 B1 | 3/2004 | Dilip et al. |
| 7,076,427 B2 | 7/2006 | Scarano et al. |
| 7,103,806 B1 | 9/2006 | Horvitz |
| 7,441,271 B2 * | 10/2008 | Fiatal et al. .................... 726/22 |
| 2001/0052081 A1 | 12/2001 | Mckibben et al. |
| 2002/0005898 A1 | 1/2002 | Kawada |
| 2002/0010705 A1 | 1/2002 | Park et al. |
| 2002/0059283 A1 | 5/2002 | Shapiro et al. |
| 2002/0087385 A1 | 7/2002 | Vincent |
| 2002/0129140 A1* | 9/2002 | Peled et al. .................. 709/224 |
| 2003/0033145 A1 | 2/2003 | Petrushin |
| 2003/0059016 A1 | 3/2003 | Lieberman et al. |
| 2003/0163360 A1 | 8/2003 | Galvin |
| 2004/0098295 A1 | 5/2004 | Sarlay et al. |
| 2004/0141508 A1 | 7/2004 | Schoeneberger et al. |
| 2004/0161133 A1 | 8/2004 | Elazar et al. |
| 2004/0249650 A1 | 12/2004 | Freedman et al. |
| 2005/0094651 A1* | 5/2005 | Lutz et al. .................... 370/401 |
| 2005/0127171 A1* | 6/2005 | Ahuja et al. ................. 235/382 |
| 2006/0034198 A1* | 2/2006 | Makinen et al. ............. 370/310 |
| 2006/0072550 A1* | 4/2006 | Davis et al. .................. 370/352 |
| 2006/0089837 A1 | 4/2006 | Adar et al. ..................... 705/1 |
| 2006/0093135 A1 | 5/2006 | Flatal et al. |
| 2008/0165940 A1* | 7/2008 | Fiorillo et al. ........... 379/88.23 |
| 2008/0216158 A1* | 9/2008 | Imbimbo et al. ................ 726/4 |
| 2008/0276294 A1* | 11/2008 | Brady ............................ 726/1 |
| 2009/0016526 A1* | 1/2009 | Fiatal et al. ................. 380/255 |

FOREIGN PATENT DOCUMENTS

| | | |
|---|---|---|
| EP | 1 484 892 | 12/2004 |
| WO | 95/29470 A | 11/1995 |
| WO | 98/01838 A | 1/1998 |
| WO | 00/73996 | 12/2000 |
| WO | 02/37856 | 5/2002 |
| WO | 03/013113 A2 | 2/2003 |
| WO | 03/067360 A2 | 8/2003 |
| WO | 03/067884 A1 | 8/2003 |
| WO | 2004/091250 | 10/2004 |

OTHER PUBLICATIONS

U.S. Appl. No. 10/362,096, filed Aug. 2001, Haynir, et al.

U.S. Appl. No. 10/469,550, filed Apr. 2001, Haynir, et al.

Aharonot, Y., "The Camera that Never Sleeps".

Amir, N., et al., "Towards an Automatic Classification of Emotions in Speech".

Article Sertainty-Automated Quality Monitoring-SER solutions, Inc. -21680, www.ser.com, Ridgetop Circle Dulles, Va.

Article Sertainty-Agent Performance Optimization-2005 SE Solutions, Inc.

Bimbot, F. et al., "A tutorial on text-independent verification" (Aug. 8, 2003).

Bimbot, et al., A tutorial on Text-Independent Speaker Verification EURASIP Journal on Applied Signal Processing 2004:4, pp. 430-451 (2004).

Chaudhari, V., et al., Very large Population Text Independent Speaker Identification Using Transformation Enhanced Multi-grained Models (Oct. 2000).

Chen, Q., "A Data Warehouse/OLAP Framework for Scalable Telecommunication Tandem Traffic Analysis".

Dror, Y., "The Computer at the other end of the line" Ha'aretz,(Feb. 17, 2002).

Freedman, I., Closing the contact center quality loop with the customer experience management, Customer Interaction Solutions. vol. 19, No. 9, (Mar. 2001).

Financial Companies want to turn Regulatory burden into Competitive advantage, Feb. 24, 2003 from Information Week, http://www.informationweek.com/story/IWK20030223S0002.

Mark, L.R., et al., "White Paper-Sertainty Quality Assurance" SER Solutions Inc. (2003-2005).

Muthusamy, Y. et al., "Reviewing Automatic Language Identification", IEEE Signal Processing Magazine, pp. 33-41.

Nice Vision-Secure your Vision, a prospect by NICE Systems Ltd.

NICE Systems announces New Aviation Security Initiative, Reprinted from Security and Technology & Design.

PR Newswire, NICE Redefines Customer Interactions with Launch of Customer Experience Management (Jun. 13, 2000)..

PR Newswire, Rcognition Systems and Hyperion to provide Closed Loop CRM Analytic Applications (Nov. 17, 1999).

Reynolds, D.R., Robust Text Independent Speaker Identification Using Gaussian Mixture Speaker Models-IEEE Transactions on Speech and Audio Processing, vol. 3, No. 1, (Jan. 1995).

Reynolds, D.A., et al., "Speaker Verification Using Adapted Gaussian Mixture Models" (Oct. 1, 2000).

Robust Test Independent Speaker Identification Using Gaussian Mixture Speaker Models.

SEDOR-Internet pages from http://www.dallmeier-electronic.com.

Zigel, Y., et al., "How to deal with multiple-targets in speaker identification systems?".

Zissman, M.A., "Comparison of four Approaches to Automatic Language Identification of Telephone Speech", IEEE Transactions on Speech and Audio Processing, vol. 31-44.

* cited by examiner

METHOD AND APPARATUS FOR COMBINING TRAFFIC ANALYSIS AND MONITORING CENTER IN LAWFUL INTERCEPTION

RELATED APPLICATION

The present invention relates and claims priority from a PCT application having serial number PCT/IL2006/000591 and filing date of May 18, 2006.

BACKGROUND OF THE INVENTION

1. Field of the Invention

The present invention relates to a method and apparatus for a law enforcement monitoring center in general, and to the integration of data obtained from lawful interception with data retention reservoirs, in particular.

2. Discussion of the Related Art

Traditional lawful interception relies mainly on intercepting phone calls of known targets, for which warrants had been issued. Modern lawful interception comprises intercepting additional communication means used by the known targets, including computerized sources such as e-mails, chats, web browsing, VOIP communications and others. The process of monitoring a target includes analysis of the captured information and related meta data using a variety of technologies, displaying different data sources on the same platform, and managing the entire workflow of one or more investigators. However, all the information can be captured only for known targets through the issuance and usage of warrants.

On the other hand, traffic analysis, which may rely on a variety of communication traffic information, including data retention sources such as call detail records (CDR), IP detail records (IPDR), or data retention of any communication traffic, uses large volumes of meta data in order to deduce connections between entities, whether the entities themselves are a-priori known or not. In the lawful interception community, traffic analysis performed upon data retention sources can be used to draw meaningful conclusions related to additional targets, communication types, communication patterns, and the like. CDR, IPDR, or Data Retention of any communication traffic as collected by communication providers, and advanced data mining, analysis and visualization performed upon them, can be a powerful tool for law enforcement agencies. However, most of the data is banned due to security and privacy limitations. Only data items authorized through a warrant, which is specific to a known target can be provided to and used by the law enforcement agencies.

Thus, there is a significant gap between the available information as collected through lawful interception, as well as CDR, IPDR, or data retention of any communication traffic as collected for example by service providers, and those parts of the collected information that can be lawfully used for improving the work of law enforcement agencies.

There is therefore a need for an apparatus and method that will enable law enforcement agencies to use CDR, IPDR, or Data Retention of any communication traffic, as collected by service providers to enhance and provide insight and information to lawful interception, without violating privacy or security rules.

SUMMARY OF THE PRESENT INVENTION

It is an object of the present invention to provide a novel method and apparatus for combining data collected through lawful interception, and data collected through usage of mining, analysis, or visualization tools. In accordance with the present invention, there is thus provided a method for integrating intercepted communication traffic data or communication traffic content with an at least one stored record, the method comprising the steps of receiving intercepted communication traffic data or communication traffic content from an interception source; receiving one or more stored record from a data retention source; and analyzing the stored records in association with the intercepted communication traffic data or communication traffic content. Within the method, the stored record can be a communication traffic stored record, or a non-communication traffic stored record, such as a customer record, a financial record, or a travel record. The method can further comprise a querying step for querying the data retention source or a data retrieval step according to one or more criteria. The stored record can comprises information which is a response to a query addressed to the data retention source. The method can further comprise a display step for displaying information to a user. The display step can display any one of the following: a result associated with the analyzing step, raw data, or information related to an operation performed by the user. The display step can provides graphic presentation of information, which can comprise one or more connection maps. The display step can also provide textual presentation of information. The method can further comprise an abstraction step for eliminating information from the stored records. The information being eliminated can be identifying information. The method can further comprise a formatting step for formatting intercepted communication traffic data or communication traffic content or a stored record. The method can further comprise a storing step for storing intercepted communication traffic data or communication traffic content, or a stored record. The storing step can store the intercepted communication traffic data or communication traffic content, or the stored record in a database.

Another aspect of the disclosed invention relates to an apparatus for integrating intercepted communication traffic data or communication traffic content with one or more stored records, the apparatus comprising: one or more storage devices for storing the intercepted communication traffic data or communication traffic content or the stored records; one or more servers comprising one or more engines for processing information stored in the storage device; one or more computing platforms comprising one or more display devices for displaying to a user one or more results obtained by the engines; and one or more connections to one or more service provider databases. Within the apparatus, the engines can be is any of the group of: an analysis engine; a query engine; a filtering engine; or a security engine. The apparatus can further comprise one or more interception engines for capturing one or more records from the service provider databases. The storage device can be associated with a monitoring center database or with a call detail record database or with an interne protocol detail record. The servers can be in communication with one or more databases of one or more service provider.

Yet another aspect of the disclosed invention relates to a computer readable storage medium containing a set of instructions for a general purpose computer, the set of instructions comprising: receiving intercepted communication traffic data or communication traffic content from an interception source; receiving one or more stored records from a data retention source; and analyzing the stored records in association with the intercepted communication traffic data or communication traffic content.

BRIEF DESCRIPTION OF THE DRAWINGS

The present invention will be understood and appreciated more fully from the following detailed description taken in conjunction with the drawings in which.

DETAILED DESCRIPTION OF THE PREFERRED EMBODIMENT

Figure 1:
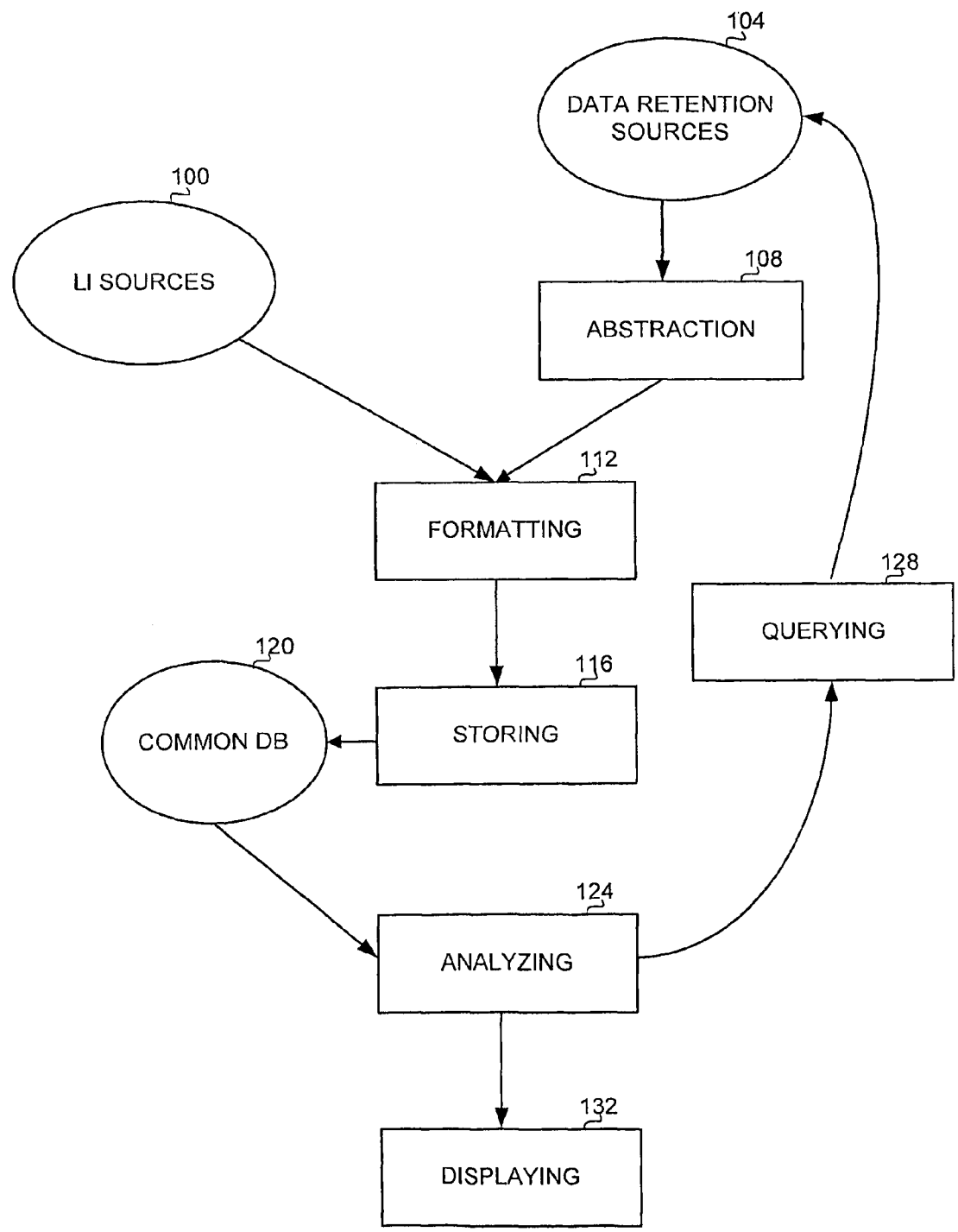
FIG. 1 is a flowchart showing the main steps and information sources, in accordance with a preferred embodiment of the disclosed invention.

The present invention overcomes the disadvantages of the prior art by providing a novel method and apparatus for the integration of stored records and products of analyzing the same, with data and meta data collected using lawful interception systems, and products of analyzing the same. The stored records can include communication traffic such as retained Call Data Records (CDR), Internet Protocol Data Records (IPDR), data retention of any communication traffic, or additional sources of non-communication related data including databases such as customers databases; financial records including for example transactions, accounts ownership or credit cards record; travel records including airlines, hotels, border control and additional sources or record types.

The current situation results in increasing legislation which forces service providers, such as telephone, cellular, internet, network operators, service providers, financial institutes, airlines, or other companies for higher degree of data retention than in the past. For example, it is now becoming mandatory by law in the European community countries for telephone, cellular and internet service providers to retain meta data on their systems for a fixed amount of time. The retained data comprises communication traffic stored records and generally consists of meta data related to a communication, rather than the communication itself Even partial meta data, excluding identifying details of the communicating entities, when combined with data, meta data and analyzed data collected through lawful interception can provide valuable information, without violating the security or privacy of entities for which no warrant exists that allows interception. Suppose for example, that a law enforcement investigator suspects that a person A is in contact with a person B, but no direct communication is detected when lawfully collecting communications of A and B. However, analyzing CDRs of a telephone company can show that A communicated with C, followed by C communicating with D, and D communicating with B, wherein neither C nor D are targets. Another possibility is that C and D did not communicate directly, but via additional one or more non-targets. The communication between C and D is a link that is thus unavailable to the investigators, in the case that C, D, or any other entity on the communication chain, is not a target. Thus, presenting the communication chain details, even without revealing the identities of the non-targets on the communication chain, provides valuable information to the investigator. Analyzing data from data retention sources is sometimes called traffic analysis. Fusing intercepted data or its products, with data obtained from traffic analysis, can thus enrich the understanding of an investigator, and provide important information related to targets. Displaying in a convenient, possible graphic manner the fused information may also provide an investigator with valuable information, while enabling him or her focus on those parts that are of interest for them and not be overwhelmed by access irrelevant information. Combining traffic analysis techniques can thus assist in identifying suspects based on communication patterns, identifying additional communication devices of known targets, identifying groups related to targets and relations within a group, and finding direct or indirect links between targets.

Referring now to FIG. 1, showing a flowchart of the main steps and information sources used in a preferred embodiment of the disclosed invention. The disclosed invention uses information acquired from lawful interception sources 100, such as captured or recorded or otherwise acquired phone conversations, possibly with automatic or manual transcription, e-mail messages, chat sessions, web browsing history, voice over IP (VoIP) communications, faxes, video recordings or other activity or communications. The data optionally includes meta data, data and products of analysis performed on the data. For example, in a phone conversation, the data may include details such as the calling number, the called number, date and time or the like. The data itself consists of the voice recording, and analysis products include for example a manual or automatic transcription of the call, specific words or phrases spotted within the call or other analysis products. An additional source of information is data retention sources 104, preferably comprising meta data such as communication traffic stored records, financial data, customer data, travel data or the like. Examples for meta data include telephone call details as mentioned above, IP address from which a person engaged in a chat session and the duration of the session, details of an e-mail message, travel records, financial records such as credit card uses or the like. The distinction between actual data and meta data is sometimes blurred, for example the subject of an e-mail message can contain actual data or just meta data. The information from data retention sources 104 optionally goes into abstraction step 108, which eliminates details, preferably identifying details which may include names, telephone numbers, or the like. Optionally, only data items retrieved in response to querying step 128 detailed below enter abstraction step 108. Alternatively, all the information received from a data retention source enter abstraction step 108. Abstraction step 108 enables the service providers to supply the data to law enforcement agencies without infringing their non-target customers' privacy. The abstraction can be performed, for example, by assigning a pseudo-name or number comprising arbitrary character strings to details of a call that should not be exposed. In yet another embodiment, abstraction step can eliminate technical details such as communication device and details, so that an investigator can focus on the essence of a communication regardless of its type. At formatting step 112, information from LI sources 100 and from retention sources 104 which has been abstracted at abstraction step 108 is formatted into a common formatting so that data of both sources can be referred to and used together, in order to obtain maximal insight. At storing step 116, the formatted data is stored together in common DB 120. At analyzing step 124, the system according to the disclosed invention analyses the data that was received from data retention sources 104, in association with information received from LI sources 100. For example, such analysis can reveal indirect communication between two targets whose communications were intercepted but had not revealed direct communication between them. Alternatively, the data collected at common DB 120, is analyzed in a similar manner to currently available methods, but taking into account also the information added from data retention sources 104. The common analysis is performed whether the data form data retention sources 104 was added to common DB 120 in association with the current investigation, or not. For example, a user can ask whether there was indirect communication between target A and target B, on a certain date range. However, in order to obtain information, such as in the examples discussed in association with FIG. 2 below, the analysis might require a querying stage 128, for addressing a query to and receiving retrieved additional information from data retention source 104. Data can be retrieved from data retention source 104 in response to queries related to any one or a combination of multiple criteria, such as the location of a telephone, cell ID, an area code or a prefix of a telephone number, a country code, a communication device or network such as a prepaid account or public phone, an IP set of addresses, an IP port range, IP application type, a time frame etc. Alternatively, the criteria can relate to other fields, such as traveling, crossing borders, performing financial transactions or the like. In yet another alternative, the used criteria can be a combination of two or more single parameters, such as those detailed above. The retrieved data passes is abstraction step 108, formatting step 112, and storing step 116 as detailed above. One or more results of analysis step 124 are then presented to a user at displaying step 132. The display can be textual, graphical, or take any other form that exhibits the results of analysis step 124, raw data, operations performed by a user such as queries, and other data that is of interest to the user. If the results of analysis step 124 show the necessity of exposing the identity of a non-target, the user can then use the information for preparing an evidence to be shown to a judge or another authority, and ask for the issuance of a warrant for the non-target, thus converting it into a target.

Figure 2A:
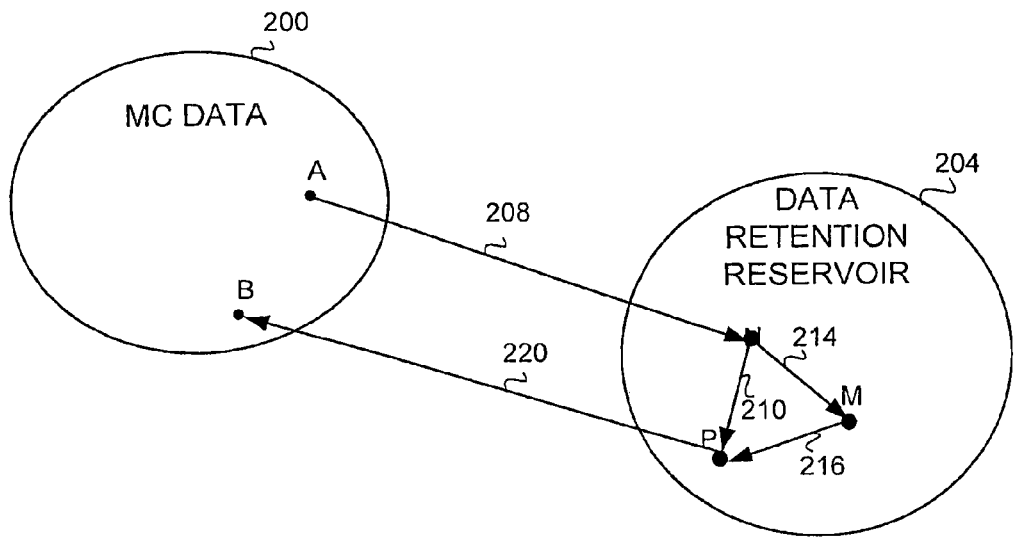
FIGS. 2A, 2B, and 2C are schematic illustrations showing examples to data that can be obtained using a preferred embodiment of the disclosed invention.
Figure 2B:
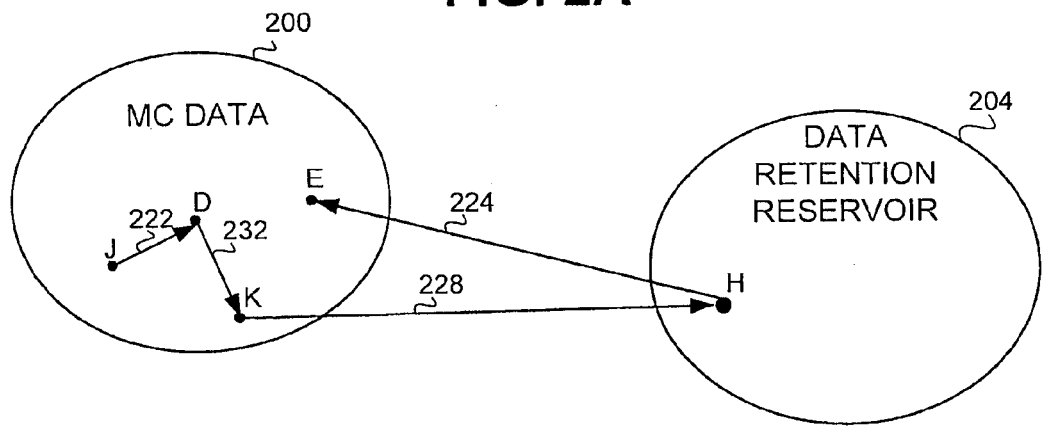
Figure 2C:
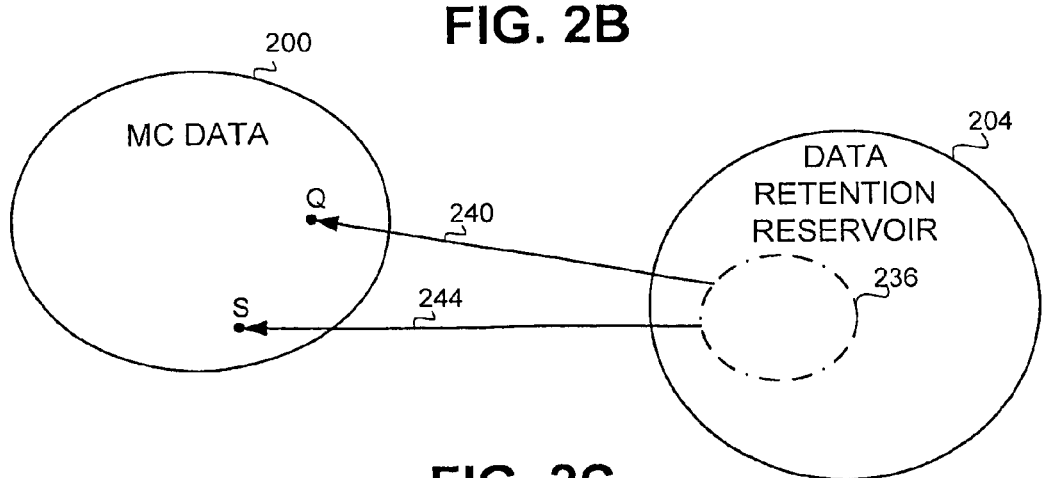

Referring now to FIGS. 2A, 2B, and 2C showing examples for possible uses of the method and apparatus. In both FIG. 2A and FIG. 2B, MC data 200 represents the data collected in a monitoring canter, which can include meta data related to communication items, the actual data of the communication such as the voice, and products of analysis of the data, such as transcript, spotted words, emotion level of the communication or the like. In both figures, data retention reservoir 204 represent data collected by one or more service providers, which is provided to a law enforcement organization. Data retention reservoir 204 is optionally partial and does not contain identifying details, but only technical details such as call date, time, and duration, IP address, travel record, financial transaction, or the like. In FIG. 2A, the investigator is interested in possible connection between person A and person B, both being known targets, and their communications intercepted. However, A and B, who are probably aware of being targets, refrain from direct communication. In FIG. 2A, P, N and M are all non-target entities, whose communications are generally not intercepted, unless they are communicating with a target. Thus, in order for A to communicate with B, A communicates with N at step 208, which is intercepted since A is a target, N communicates with P at step 210, a communication which is not intercepted since neither P nor N are known targets, and P communicates with B at step 220, which is intercepted, but can not be used to complete the A-B communication since the N-P communication is not available through interception. Alternatively, it is is possible that even N and p do not communicated directly but rather N communicates with M at step 212 and M communicates with P at step 216, which can also support the connection A-B. All mentioned communications must be timed in a manner that enables the deduction of A-B communication, i.e. 208 preceding 210 (or 212, which in turn precedes 216) which precedes 220. The N-P or N-M-P communication, with acceptable timing, can be revealed using analysis tools, such as I2 (www.i2inc.com/) or Tom Sawyer (www.tomsawyer.com). Once the communications have been detected, an investigator can also ask for a warrant against N, M, or P, in response to which the service provider will have to expose N, M, or P's identity and intercept their future communications. Other important outputs are, for example, detecting communication patterns, including times, time gaps, number of links, group structure and relation or persons between groups, or the like, which can provide important information for an investigator, for a current investigation as well as to future ones.

Referring now to FIG. 2B, showing another possible usage of the system. In FIG. 2A the situation was based solely on meta data, both from MC data 200 and form CDR/IPDR data 204. However, in FIG. 2B, some of the connections are deduced from products of MC data 200. In FIG. 2B, the investigator is interested in assessing a communication between D and E. By intercepting and analyzing D's communications, for example by spotting the name of K in D-J communication 222, the investigator deduces that K might be involved although it is not apparent, and thus communication 232 between D and K is intercepted, Then, it is possible through analysis to deduce K-H communication 228 and H-E communication 224. If all communications are timed in a manner that enables the D-E indirect communication, then the missing link is found.

Referring now to FIG. 2C, showing another possible usage of the system. In FIG. 2C area 236 represents one or more records in data retention reservoir 204 which comply with a certain data researching criteria. Such criteria could be for example the location of a telephone, cell ID, an area code or a prefix of a telephone number, a country code, a communication device or network such as a prepaid account or public phone, an IP set of addresses, an IP port range, IP application type, a time frame etc. Alternatively, said criteria can be a combination of two or more single parameters, such as those detailed above. Q in MC data 200, retrieved at step 240 represents one or more results which are known targets in the system, and S, retrieved at step 244 represents or one or more results which are new targets or new candidates to be targets in the system, as discovered by the analysis of data retention reservoir 204.

It will be appreciated by a person skilled in the art that the three examples are provided to merely demonstrate possible uses of various tools in the system, including content analysis tools on MC data 200, such as word spotting, and analysis tools such as such as I2 (www.i2inc.com) or Tom Sawyer (www.tomsawyer.com) on both MC data 200 and CDR/IPDR data 204. It will be apparent to a person skilled in the art that additional tools exist, and additional situations in which different tools and tool combinations are used to detect communications, entities and other data items relevant for the law enforcement agency.

Figure 3:
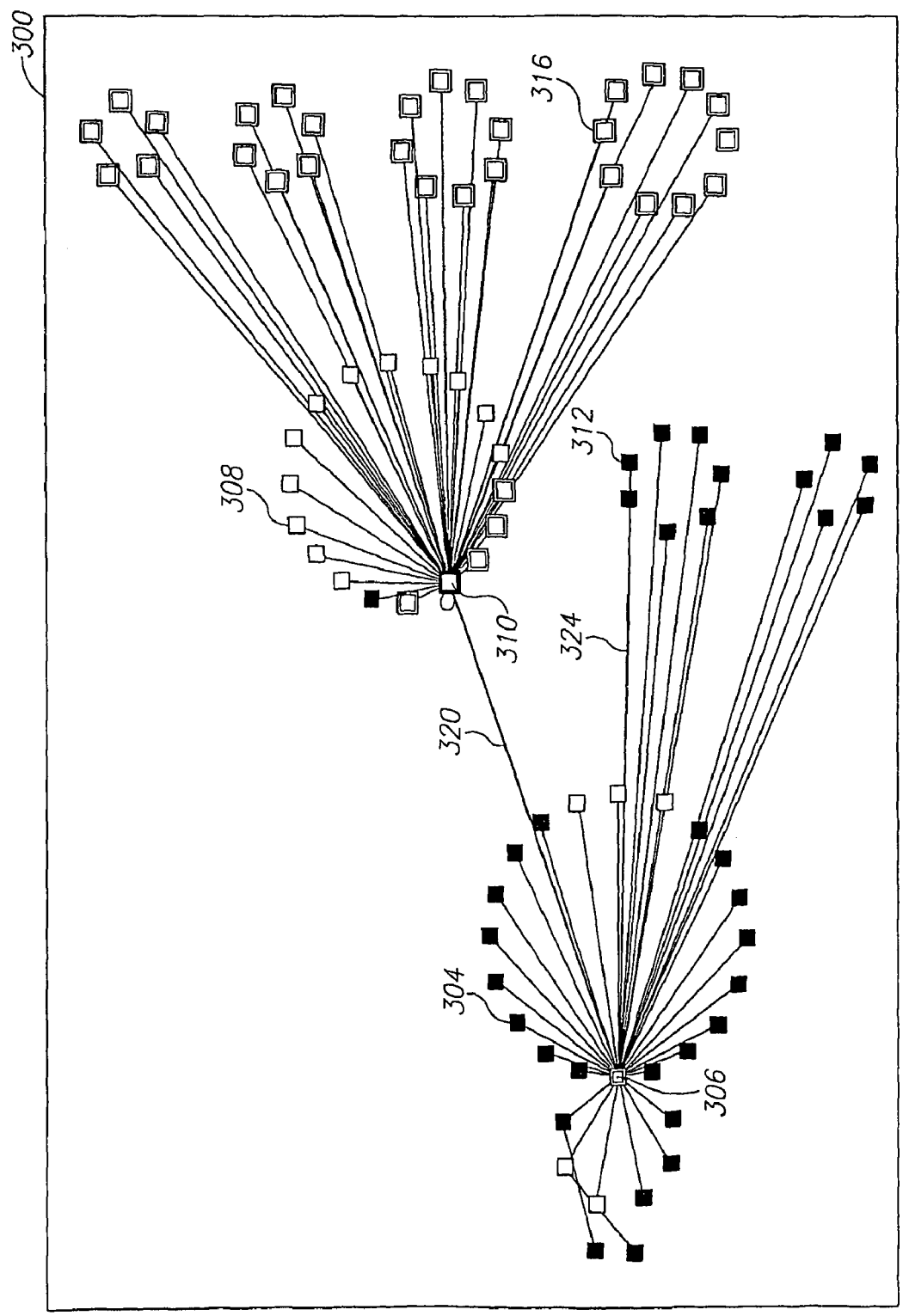
FIG. 3 is an illustration of a connection map in accordance with a preferred to embodiment of the disclosed invention.

Reference is now made to FIG. 3, which is an illustration of a possible connection map generated by an analysis tool, designed to work on data retention sources 104 of FIG. 1, possibly in conjunction with data from LI sources 100 of FIG. 1. The analysis tool detects connections between entities in the system, and provides textual or graphical representation of the detected connections and preferably their intensity. The connection map shown in FIG. 3 comprises vertices representing entities, the vertices being connected by edges representing connections between entities. For example, the entities can represent persons and the edges can represent that communication took place between the two persons, wherein the width of the edge is indicative to the intensity of the communications between the two persons. Preferably, a thicker line indicates more intensive communication between the persons. Alternatively, vertices can represent documents, such as e-mails, transcription of phone conversations, articles or other documents, and edges can represent the similarity between the documents, wherein a wider edge represents a higher degree of similarity between the two documents it connects. Clicking or otherwise requesting to see the contents of a vertex preferably shows the details of the vertex, under the relevant security limitations. For example, if a vertex represents a person, his or her details will be shown if he is a known target for which a warrant exists, and if the vertex is a document it will be presented, if allowed, possibly together with its source. Clicking or otherwise pointing at an edge that represents communications can open a list of actual communications between the participants of the communication and show details and possibly the contents of one or more communications. Clicking on an edge that represents similarity between documents can open up a list of similarity factors, such as common words, subjects, style, or the like. An edge may represent either an explicit connection between two vertices, such as a direct communication between two persons, or an implicit connection, such as a phone call between one of the persons to a third person, followed by a phone call between the third person and the second person. FIG. 3 shows a connection map, concentrating on vertices 306 and 310. Suppose that vertices in FIG. 3 represent persons, whilst edges represent the existence of communications between persons. However, the same map can also represent documents and similarities or other contents. Vertex 308 is hollow, while vertex 312 is solid, vertex 306 has a hollow frame and vertex 310 has a solid frame. These characteristics can represent different concepts related to the entities represented by the vertices. For example, if a vertex represents a person, the different graphic characteristics can represent being a major target, a minor target, non-target, or an organization rather than a person. The edge connecting 306 and 310 is thick, and therefore represents intensive communication between 306 and to 310. It is an option to perform additional analysis and adjustments on the map, for example, adding an edge between 306 and 316, since edges 306-310 and 310-316 indicate intensive communications. Alternatively, it is possible to filter information in order to enhance clarity. Thus, a user can request to see only edges having a predetermined intensity level and higher, only edges between targets, only edges for which the communication occurred during a predetermined period of time, only direct edges, only edges representing communication with at most a predetermined number of intermediate connections, or other content according to a predetermined criteria.

Figure 4:
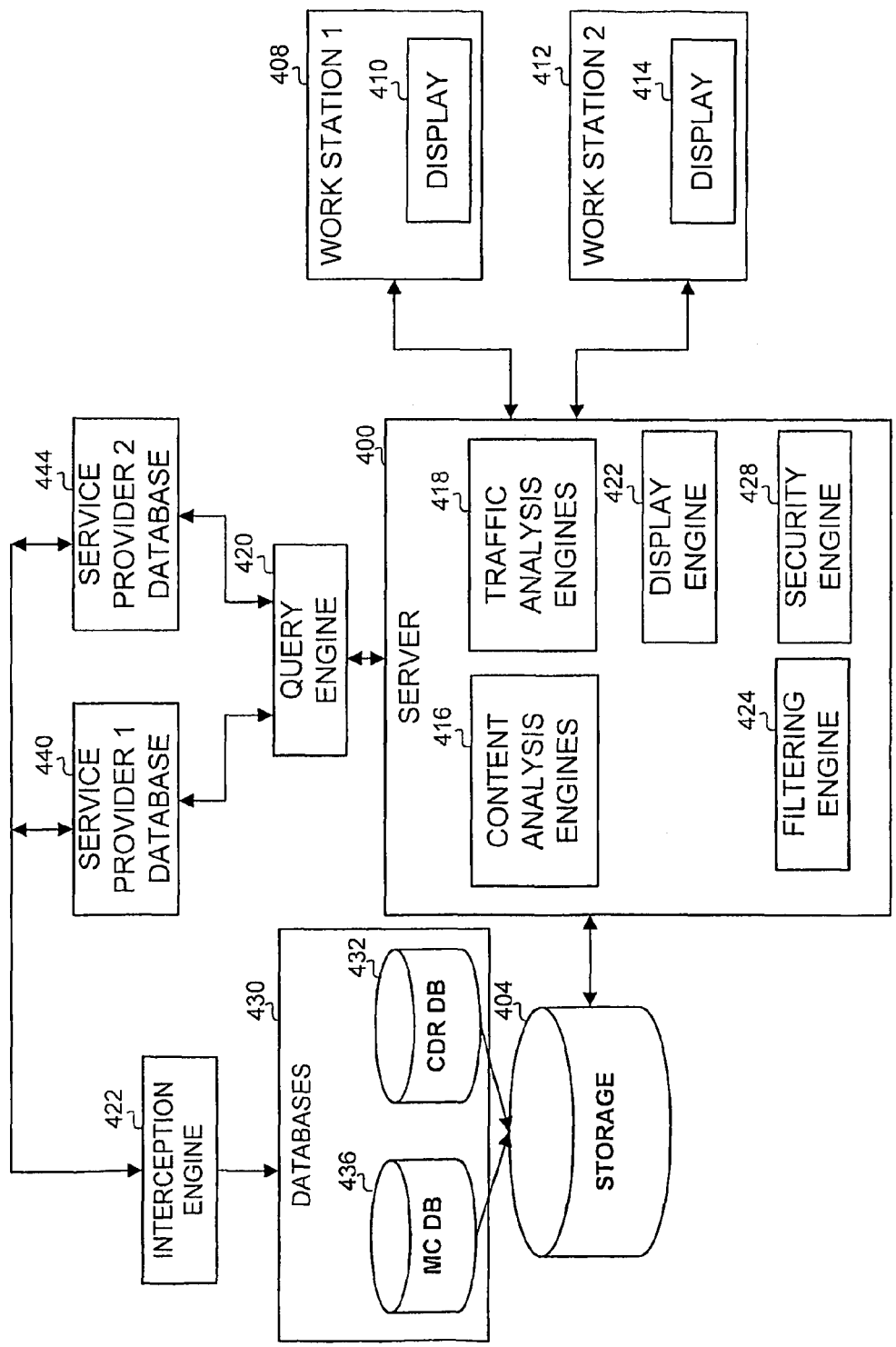
FIG. 4 is a block diagram showing the main components of an apparatus in accordance with a preferred embodiment of the present invention.

Referring now to FIG. 4, showing a preferred embodiment of an apparatus implementing the methods of the disclosed invention. The apparatus comprises a server 400, which is accesses by one or more users using one or more work stations, such as the exemplary workstation 1 (408) and workstation 2 (412). Server 400 is connected to storage device 404, which comprises, or is connected to a database unit 430, comprising data retention database 432, which comprises communication traffic stored records and to monitoring center database (MC DB) 436. Each of server 400, workstation 1 (408) and workstation 2 (412) is preferably a computing platform, such as a personal computer, a mainframe computer, or any other type of computing platform that is preferably provisioned with a memory device (not shown), a CPU or microprocessor device, and several I/O ports (not shown). Alternatively, each of server 400, workstation 1 (408) and workstation 2 (412) can be a DSP chip, an ASIC device storing the commands and data necessary to execute the methods of the present invention, or the like. Workstation 1 (408) and workstation 2 (412) are preferably provisioned with one or more input devices such as a mouse, a keyboard, a joystick or others for receiving commands, queries or other inputs from a user, and with one or more output devices, such as a display 410 or 414 for outputting information to the user. Each of storage device 404, CDR DB 423 and MC DB 436 preferably comprises a physical storage such as a magnetic tape, a magnetic disc, an optical disc, a laser disc, a mass-storage device, or the like, and optionally a management device or application, such as Microsoft SQL server, manufactured by Microsoft of Redmond, Wash., USA. Server 400 preferably further communicates through query server 420 with one or more service provider databases such as service provider 1 database (440) or service provider 2 database (444)., Query server 420 is designed for generating and referring queries related to data items not appearing in data retention database 432 to service provider 1 database (440) or service provider 2. Additionally, query server 420 can address queries to storage 404, or any of databases 430. Results of queries addressed to service provider 1 database (440) or service provider 2 database (444) are preferably intercepted by interception engine 422 and stored in databases 430, and in particular in data retention database 432.

Server 400 is further responsible for processing the information comprised in storage device 404, using both content analysis tools for MC DB 436 information and traffic analysis tools for data retention database 432 information and MC DB 436 information. Server 400 comprises engine components, preferably implemented as software applications or as additional computing platforms connected to server 400. The engines are designed to process information stored on storage 404. The engines comprise content analysis engines 416, which can comprise one or more content analysis tools for processing intercepted communications stored in MC DB 436, such as speech-to-text, word spotting, emotion detection, call flow analysis, and the like. Server 400 further comprises traffic analysis engines 418 for processing or analyzing meta data stored in data retention database 432, optionally in conjunction with data from MC DB 436. Such analysis can be used to reveal direct or indirect communications between targets, documents or the like, identify communication patterns, group structure or the like. Data obtained form content analysis engines 416 of traffic analysis engines 418 can be stored in storage device 404, hence the bidirectional arrow connecting server 400 and storage device 404. Another engine is display engine 422 used for constructing a display of the obtained information, which will enable a user to receive clear and yet valuable information. Alternatively, display engine 422 or parts thereof can be a part of workstation1 408 or workstation2 412. Yet another engine is filtering engine 424 for filtering information, designed to limit the quantity of data received by a user to a manageable level. Sometime, a user may be faced with information overflow, in which case content based information filtering can help him or her concentrate on the important parts. For example the user may ask to see only connections between targets or data items that were labeled as relevant, only items having a high certainty degree, or the like. Filtering can sometimes be viewed as limiting the number of vertices or edges in a graph as shown in association with FIG. 3 above. Security engine 428 is designed to hide information from a user, based on security and privacy policies. For example, the identity of non-targets communicating with targets may be hidden from one or more users, although the mere fact that such communication took place may be exposed. The information is hidden or revealed according to the user, the context, privacy policy, the relevant parties and possibly additional factors. Engines 416, 420, 424 and 428 are preferably implemented as one or more sets of logically inter-related computer instructions or programs and associated data structures that interact to perform the relevant activities. It will be appreciated by a person skilled in the art that the division of the collection of the computer instructions, programs and data structures into the described engines is schematic, and other divisions or no division at all can be implemented. Alternatively, some engines may be omitted, replaced by others, or any other variation which still maintains the spirit of the current invention.

The disclosed invention describes methods and apparatus for combining conventional monitoring center techniques and methodologies related to lawful interception and analysis of the intercepted communications, with analysis of data collected by service providers, in order to reveal connections and communications between targets or other entities, which could not be identified otherwise. Combining traffic analysis techniques with monitoring center interception can thus assist in identifying suspects based on communication patterns, identifying additional communication devices of known targets, identifying target groups and relations within a group, and finding direct or to indirect links between targets. The disclosed methods provide a user with a high degree of flexibility, in order to let him or her concentrate on persons, communication or other entities that seem important, without losing the greater picture.

It will be appreciated by persons skilled in the art that many alternatives and variations exist to the described methods and apparatus. The distribution of the different analysis functions between the components shown in FIG. 4 can be different, for example more analysis tasks can be performed by the workstations themselves. Alternatively, some of the queries performed by query engine 420 can be performed by storage device 404, or other variations. As for the presentation, variation schemes other than the connection map shown on FIG. 4 can be designed, and additional features can be added to enable an investigator easy access to information. In addition, other sources of information can be incorporated and used within the system, and additional analysis types can be integrated.

It will be appreciated by persons skilled in the art that the present invention is not limited to what has been particularly shown and described hereinabove. Rather the scope of the present invention is defined only by the claims which follow.

We claim:

1. A method for integrating data or content of intercepted communication with an at least one stored record, the method comprising the steps of:
   receiving from an interception source data or content of the intercepted communication in which a target participates, the communication intercepted in accordance with a warrant;
   receiving an at least one stored record from a data retention source; and
   analyzing and integrating the at least one stored record in association with the intercepted communication data or content.

2. The method of claim 1 wherein the at least one stored record is a communication traffic stored record.

3. The method of claim 1 wherein the at least one stored record is a non-communication traffic stored record.

4. The method of claim 3 wherein the at least one stored record is selected from the group consisting of: a customer record, a financial record, and a travel record.

5. The method of claim 1 further comprising a querying step for querying the data retention source.

6. The method of claim 1 further comprising a data retrieval step according to one or more criteria.

7. The method of claim 1 wherein the stored record comprises information which is a response to a query addressed to the data retention source.

8. The method of claim 1 further comprising a display step for displaying information to a user.

9. The method of claim 8 wherein the display step displays any one of the following: an at least one result associated with the analyzing step, raw data, or information related to an operation performed by the user.

10. The method of claim 8 wherein the display step provides graphic presentation of information.

11. The method of claim 10 wherein the graphic representation comprises an at least one connection map.

12. The method of claim 8 wherein the display step provides textual presentation of information.

13. The method of claim 1 further comprising an abstraction step for eliminating information from the at least one stored record.

14. The method of claim 13 wherein the information being eliminated is identifying information.

15. The method of claim 1 further comprising a formatting step for formatting the intercepted communication data or content, or the at least one stored record.

16. The method of claim 1 further comprising a storing step for storing the intercepted communication data or content, or the at least one stored record.

17. The method of claim 16 wherein the storing step stores the intercepted communication data or content, or the at least one stored record in a database.

18. The method of claim 1 wherein the data retention source is external to an operator of the interception source.

19. An apparatus for integrating data or content of intercepted communication associated with a target and captured in accordance with a warrant, with at least one stored record, the apparatus comprising:
   an at least one storage device for storing the data or content of the intercepted communication, or the at least one stored record;
   an at least one server comprising an at least one engine for processing information stored in the storage device and integrating the at least one stored record in association with the data or content of the intercepted communication;
   an at least one computing platform comprising an at least one display device for displaying to a user an at least one result obtained by the at least one engine; and
   an at least one connection to an at least one service provider database.

20. The apparatus of claim 19 wherein the at least one engine is any of the group of: an analysis engine; a query engine; a filtering engine; or a security engine.

21. The apparatus of claim 19 further comprising an at least one interception engine for capturing an at least one record from the at least one service provider database.

22. The apparatus of claim 19 wherein the storage device is associated with a monitoring center database or with a call detail record database or with an interne protocol detail record.

23. The apparatus of claim 19 wherein the at least one data record is received from a source external to an operator of the interception source.

24. A tangible computer readable storage medium containing a set of instructions for a general purpose computer, the set of instructions comprising:

receiving from an interception source data or content of intercepted communication in which a target participates, the communication intercepted in accordance with a warrant;

receiving an at least one stored record from a data retention source; and analyzing and integrating the at least one stored record in association with the data or content of the intercepted communication.

* * * * *